United States Patent
Walser et al.

(10) Patent No.: US 8,002,668 B2
(45) Date of Patent: Aug. 23, 2011

(54) METHOD FOR CONTROLLING A MOTOR VEHICLE WITH AN AUTOMATED CLUTCH

(75) Inventors: Michael Walser, Friedrichshafen (DE); Thomas Jager, Meckenbeuren (DE); Florian Schneider, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 427 days.

(21) Appl. No.: 12/328,148

(22) Filed: Dec. 4, 2008

(65) Prior Publication Data

US 2009/0149297 A1    Jun. 11, 2009

(30) Foreign Application Priority Data

Dec. 6, 2007  (DE) .......................... 10 2007 055 722

(51) Int. Cl.
*B60W 10/00* (2006.01)
(52) U.S. Cl. ........................................... 477/85
(58) Field of Classification Search .................. None
See application file for complete search history.

(56) References Cited

U.S. PATENT DOCUMENTS

| 4,977,988 | A  | * | 12/1990 | Tanaka ............................. 477/87 |
| 6,227,997 | B1 | * | 5/2001  | Fujisawa et al. ................... 477/5 |
| 6,379,279 | B1 | * | 4/2002  | Miyamoto ....................... 477/87 |
| 2003/0092530 | A1 | | 5/2003 | Schwab et al. |

FOREIGN PATENT DOCUMENTS

| DE | 100 16 582 A1 | 10/2001 |
| DE | 101 05 749 A1 | 8/2002 |
| DE | 10219420      | 11/2003 |

* cited by examiner

*Primary Examiner* — Dirk Wright
(74) *Attorney, Agent, or Firm* — Davis & Bujold, P.L.L.C.

(57) ABSTRACT

The invention concerns a method for controlling a motor vehicle (2) with an automatic transmission (6) and an automated clutch (8), with a control unit (20), a drive or accelerator pedal (32), an element (30) for determining the position of the drive or accelerator pedal, and an actuating device (28) for selecting an operating mode of the motor vehicle (2). According to the invention, when the actuating means (28) is operated the position of the drive or accelerator pedal (32) is noted or evaluated, and actuation of the clutch (8) is prevented until a change in the position of the drive or accelerator pedal is recognized.

9 Claims, 2 Drawing Sheets

METHOD FOR CONTROLLING A MOTOR VEHICLE WITH AN AUTOMATED CLUTCH

This application claims priority from German Application Serial No. 10 2007 055 722.3 filed Dec. 6, 2007.

FIELD OF THE INVENTION

The invention concerns a method for controlling a motor vehicle with an automated clutch.

BACKGROUND OF THE INVENTION

In motor vehicles, especially commercial vehicles with an automated gearbox, an actuating device is often used such that various operating modes of the motor vehicle can be selected, such as "drive", "neutral", "park" or "maneuver" or "creep". By selecting the "maneuver" or "creep" operating mode, the driver is enabled to shift the transmission to an operating mode in which the clutch can be actuated particularly gently. In addition, a drive engine of the motor vehicle in this operating mode, for example an internal combustion engine, can be controlled in such a manner that a change of the drive train torque only takes place with small torque or speed gradients.

DE 101 05 749 A1 discloses a method for easier maneuvering of a commercial vehicle. The commercial vehicle comprises an automated transmission and an automated clutch, as well as a switching device. With the switching device, for example a rotary selector switch, the motor vehicle operating conditions forward-drive "D", neutral "N" and reverse "R" and maneuvering settings "RM, DM" or maneuvering assistance settings "RMB, DMB" can be selected. When the maneuvering mode is activated, then depending on the position of the accelerator pedal and the loading condition of the vehicle, the clutch and the service friction brake are automatically actuated at the same time and in harmony with one another.

DE 100 16 582 A1 discloses a motor vehicle which comprises a transmission, an automated clutch, a control device, an accelerator pedal, a brake pedal and an actuating device which is used to activate a creep process. From DE 100 16 582 A1, various configurations of the actuating device are known with which a creep process can be initiated. For example, the actuating device can be designed as a manually operated rotary selector switch which, in addition to the usual settings for the driving modes of the automatic transmission, can adopt two further stable positions in which the creep mode can be engaged either for forward or for reverse driving.

In the "maneuver" or "creep" operating mode, the clutch and/or the drive engine is controlled by a drive or accelerator pedal position determined by the driver of the vehicle. For example, in the "maneuver" or "creep" operating mode the drive or accelerator pedal deflection can be adapted so that in the "maneuver" or "creep" mode a larger actuation angle is permitted for a corresponding fuel injection quantity than in the "drive" operating mode. Thus, in the "maneuver" or "creep" mode, at the same deflection angle of the drive or accelerator pedal, the motor vehicle can be moved at a lower speed. If the motor vehicle is being operated in the "maneuver" or "creep" mode and the operating mode is changed to "drive" using the actuating device, this can result in an acceleration of the vehicle without the driver having changed the position of the drive or accelerator pedal, since the clutch and/or the drive engine are no longer actuated as gently as in the "maneuver" or "creep" operating mode.

Corresponding behavior is observed when the actuating device is switched from the "drive" to the "maneuver" or "creep" operating mode. If the motor vehicle is being operated in the "drive" mode and the actuating device is changed to the "maneuver" or "creep" mode, then in accordance with the "maneuver" or "creep" mode, the drive train torque is reduced. In situations, such as driving or starting on a slope, this, in turn, can cause the vehicle to stop accelerating. In extreme situations, it can even happen that the vehicle rolls backward without the driver having changed the pedal angle of the drive or accelerator pedal, because of the operating mode change from "drive" to "maneuver" or "creep".

Similar behavior occurs during a starting process if the actuating device is at "neutral" on the way to selecting an operating mode and the vehicle's driver actuates the drive or accelerator pedal and then moves the actuating device to another operating mode, i.e., selects a gear. This situation leads to engaging of the clutch without a change of the drive pedal position by the vehicle's driver having taken place, which can result in undesired starting of the motor vehicle.

In a motor vehicle with an automated clutch, a driver of the vehicle can usually only initiate clutch actuation via the drive or accelerator pedal or the brake pedal. Thus, actuation of the clutch, by virtue of a situation as described earlier, leads to unexpected engaging or disengaging of the clutch, where safety-critical driving situations can arise, since in the situations described earlier, neither the drive or accelerator pedal nor the brake pedal are actuated appreciably by the vehicle's driver.

The purpose of the present invention is to indicate a method for controlling a motor vehicle with an automated clutch, by way of which the disadvantages of the prior art are minimized or eliminated and which enables safe operation of the automated clutch.

SUMMARY OF THE INVENTION

The starting point of the invention is a method for controlling a motor vehicle, especially a commercial vehicle, such as a truck, a construction-site vehicle or a bus, having an automatic transmission, i.e., an automatic or automated transmission with an automated clutch, a control device, a drive or accelerator pedal, an element for determining the drive pedal position and an actuating device for selecting an operating mode of the motor vehicle.

According to the invention, it is provided that when the actuating device is used to select an operating mode of the motor vehicle, the position of the drive or accelerator pedal is noted and evaluated and actuation of the clutch is prevented until a change of the drive pedal position is recognized.

In an advantageous version of the method according to the invention, when the actuating device is switched from the "maneuver" or "creep" operating mode to the "drive" mode, the clutch can only be engaged again if the element that detects the drive or accelerator pedal position determines that the position of the drive or accelerator pedal has changed. In this way, undesired vehicle acceleration, when changing from the "maneuver" or "creep" operating mode to the "drive" mode due to the more sensitive or gentler actuation of the clutch in the "maneuver" or "creep" operating mode, can be reliably prevented.

According to another embodiment of the method according to the invention, when the actuating device is switched from the "drive" operating mode to the "maneuver" or "creep" mode, the clutch can only be disengaged again if the element that detects the drive or accelerator pedal position determines that the position of the drive or accelerator pedal has changed. In this way, the drive train torque cannot be changed by clutch actuation unless the element that detects the drive or accelerator pedal position determines that the position of the drive or accelerator pedal has changed.

In a preferred version of the method according to the invention, when a gear is engaged starting from the neutral position, i.e., when the actuating device is switched from the "neutral" mode to the "drive" or to the "maneuver" or "creep" operating mode, the clutch can only be actuated and thus engaged again when the element that detects the drive or accelerator pedal position determines that the position of the drive or accelerator pedal has changed. If the vehicle's driver actuates the drive or accelerator pedal while the transmission is in the neutral position and then uses the actuating device to change to another operating mode, the clutch is only actuated when the drive or accelerator pedal angle changes significantly, preferably in the direction of a larger drive pedal angle.

In the context of the present invention, the "drive" operating mode is understood to mean both the "forward" and the "reverse" driving ranges.

The actuating device for selecting the operating mode can be designed as a rotary selector switch and can be connected to the control unit of the motor vehicle. Such a rotary selector switch can be arranged on a drive regulator of the motor vehicle, which is provided for transmitting manual interventions by the vehicle's driver and is connected to the control unit.

The element for determining the position of the drive or accelerator pedal can be designed as a sensor arranged on the drive or accelerator pedal, by way of which the drive pedal position or drive pedal angle of the drive or accelerator pedal is detected.

Accordingly, by monitoring or evaluating the drive or accelerator pedal position when the actuating device is used to select an operating mode of the motor vehicle, a safety-critical situation that would result from undesired actuation of the clutch can be reliably prevented, since actuation of the clutch, when the actuating device is operated, is suppressed if the vehicle's driver has not significantly changed the position of the drive or accelerator pedal.

BRIEF DESCRIPTION OF THE DRAWINGS

Below, the basic principle of the invention, which can be embodied in several forms, is explained in more detail with reference to a drawing which illustrates an example thereof. The drawing shows.

DETAILED DESCRIPTION OF THE INVENTION

Figure 1:
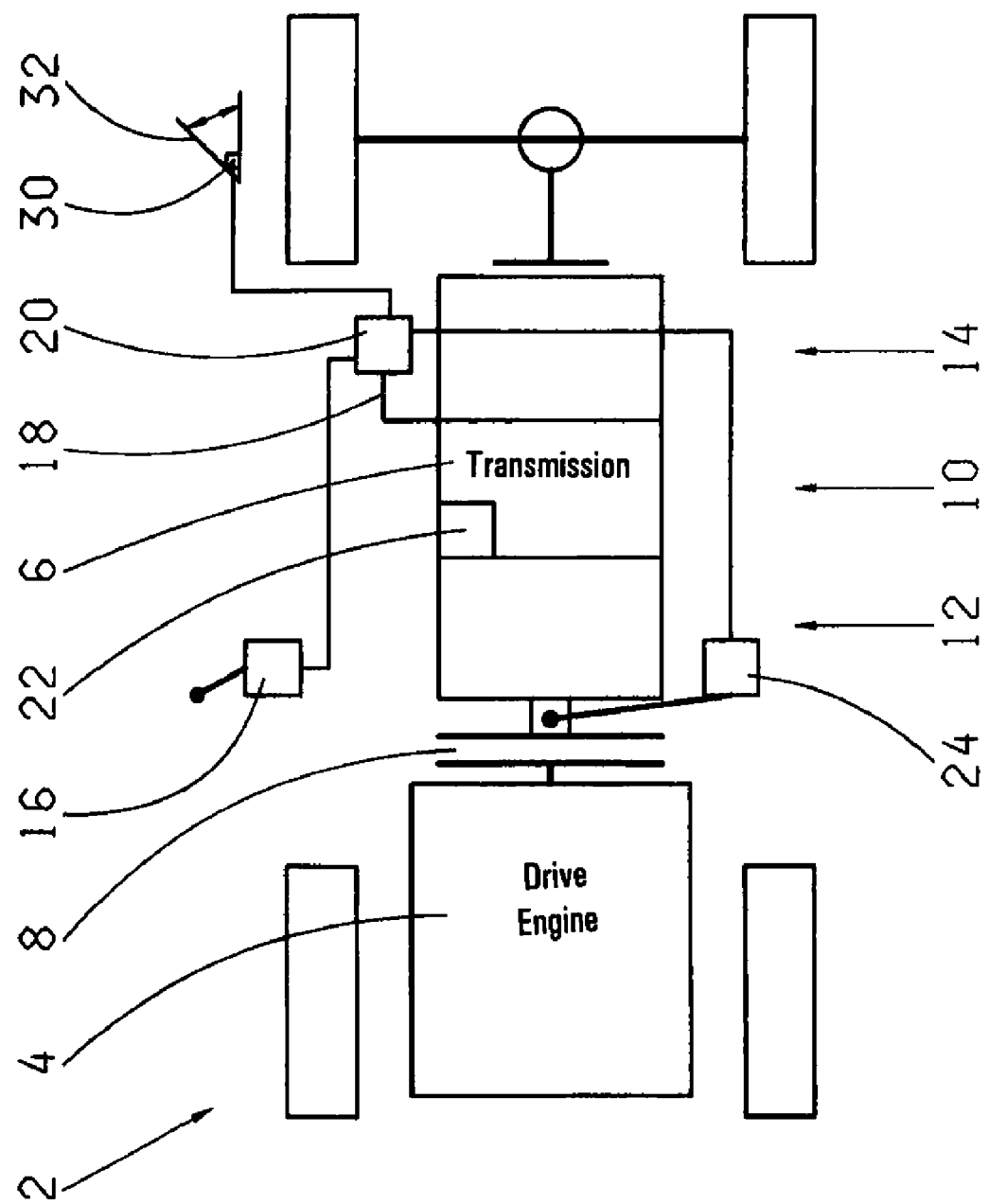
FIG. 1 is a schematic representation of a vehicle with an automated transmission.

FIG. 1 shows a vehicle 2 with a drive engine 4 and a transmission 6 with a clutch 8 arranged between them. The transmission 6 comprises a main transmission section 10, a split-group transmission section 12 and a range-group transmission section 14. The drive engine 4 can be made as an internal combustion engine. The transmission 6 is connected, by connection leads 18, to an electronic control unit 20. A drive regulator 16 is provided for transmitting manual interventions by the vehicle's driver and is connected to the control unit 20. Via another connection lead, the control unit 20 is connected to a sensor 30. The sensor 30 detects the position of a drive or accelerator pedal 32 operated manually by the vehicle's driver. The drive or accelerator pedal position is transmitted to the control unit 20. The transmission 6 is automatically shifted, in accordance with signals received by the control device 22 from the control unit 20, by a control device 22. Likewise, a clutch control 24 receives signals from the control unit 20, where the clutch 8 is actuated automatically. The signal for the position of the drive or accelerator pedal 32 and the signal for the position of an actuating device 28 are transmitted, via corresponding connection leads, to the control unit 20, where they are evaluated.

Figure 2:
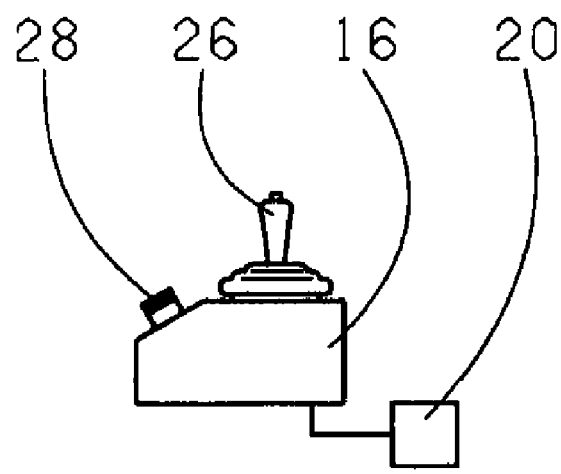
FIG. 2 is a drive regulator.
Figure 3:
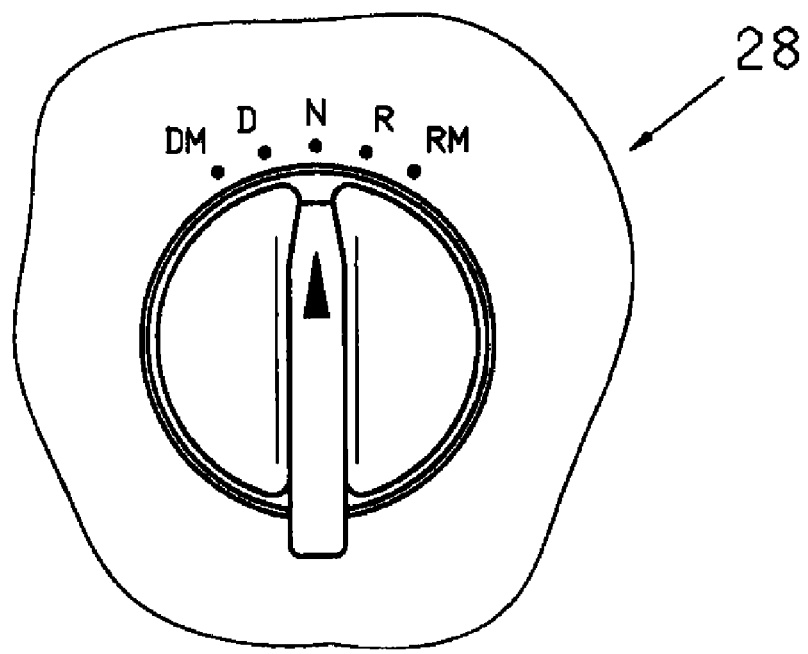
FIG. 3 is a rotary selector switch on the drive regulator.

FIG. 2 shows the drive regulator 16, which comprises a shift lever 26 and the actuating device 28, made in this case as a rotary selector switch. The drive regulator 16 is connected to the control unit 20. FIG. 3 shows the rotary selector switch 28 in more detail. A neutral position "N", a position "R" for the reversing range and a position "D" for the forward-drive range are provided. In addition, the position "RM" is a position of the rotary selector switch 28 in which a creep mode in the reversing range, is activated and which, consequently, is obtained by moving from Neutral in the direction of the "R" position. The position "DM" of the rotary selector switch 28 is a position in which a creep mode, in the forward-drive range, is activated and which is consequently obtained by moving from Neutral in the direction of the "D" position.

REFERENCE NUMERALS 2 vehicle
4 drive engine
6 transmission
8 clutch
10 main transmission section
12 split-group transmission section
14 range-group transmission section
16 drive regulator
18 connection lead
20 control unit
22 control device
24 clutch actuator
26 shift lever
28 rotary selector switch/actuation device
30 sensor
32 drive or accelerator pedal

The invention claimed is:

1. A method of controlling a motor vehicle (2) having an automatic transmission (6) and an automated clutch (8), a control unit (20), one of a drive or an accelerator pedal (32), an element (30) for determining a position of the drive or the accelerator pedal (32), and an actuating device (28) for selecting an operating mode of the motor vehicle (2), the method comprising the steps of:

evaluating the position of the drive or the accelerator pedal (32), when the actuating device (28) is operated; and preventing actuation of the dutch (8) until a change in the position of the drive or the accelerator pedal (32) is recognized.

2. The method according to claim 1, further comprising the step of engaging the clutch (8) only if the element (30) determines the position of the drive or the accelerator pedal (32) has changed when the actuating device (28) is switched from one of a "maneuver" or a "creep" operating mode to a "drive" mode.

3. The method according to claim 1, further comprising the step of disengaging the clutch (8) only if the element (30) determines the position of the drive or the accelerator pedal (32) has changed when the actuating device (28) is switched from a "drive" operating mode to one of a "maneuver" or a "creep" operating mode.

4. The method according to claim 1, further comprising the step of engaging the clutch (8) only if the element (30) determines the position of the drive or the accelerator pedal (32) has changed when the actuating device (28) is moved from a "Neutral" operating mode to one of a "drive", a "maneuver" or a "creep" operating mode.

5. The method according to claim 1, further comprising the step of transmitting a signal for the position of the drive or the accelerator pedal (32) and a signal for a position of the actuating device (28) to the control unit (20) for evaluation.

6. The method according to claim 1, wherein in the element (30) is a sensor and the method further comprising the step of determining the position of the drive or the accelerator pedal (32) with the sensor arranged on the drive or the accelerator pedal (32).

7. The method according to claim 1, further comprising the step of selecting the operating mode of the motor vehicle (2) with a rotary selector switch (28) arrangeable on a drive regulator (16) of the motor vehicle (2).

8. A method of controlling a motor vehicle (2) having an automatic transmission (6) and an engine (4) with an automated clutch (8) being located between the automatic transmission (6) and the engine (4), a control unit (20) being coupled to the automatic transmission (6), one of a drive or an accelerator pedal (32), a sensor (30) being coupled to the one of the drive or the accelerator pedal (32) for determining a position thereof with the sensor (30) being coupled to the control unit (20), a clutch control (24) being coupled to the automated clutch (8) for controlling operation of the automated clutch (8) with the clutch control (24) being coupled to the control unit (20), and an actuating device (28) for selecting an operating mode of the motor vehicle (2) with the actuating device (28) being coupled to the control unit (20), the method comprising the steps of:

evaluating the position of the drive or the accelerator pedal (32), when the actuating device (28) is operated; and preventing actuation of the automated clutch (8) until a change in the position of the drive or the accelerator pedal (32) is recognized.

9. A method of controlling an automated clutch (8) of a motor vehicle (2) with an automatic transmission (6), the method comprising the steps of:

adjusting an actuating device (28) for changing an operating mode of the motor vehicle (2) from between two of a maneuver, a creep, a Neutral, a forward drive and a reverse drive operating mode;

monitoring a position of an accelerator pedal (32);

preventing actuation of a clutch (8) and the change of the operating mode of the motor vehicle (2) until the position of the accelerator pedal (32) has changed;

engaging the clutch (8) only if the position of the accelerator pedal (32) has changed and the actuating device (28) is adjusted to change the operating mode of the motor vehicle (2) from one of the maneuver or the creep operating mode to one of the forward drive or the reverse drive operating mode;

disengaging the clutch (8) only if the position of the accelerator pedal (32) has changed and the actuating device (28) is adjusted to change the operating mode of the motor vehicle (2) from one of the forward drive or the reverse drive operating mode to one of the maneuver or the creep operating mode; and engaging the clutch (8) only if the position of the accelerator pedal (32) has changed and the actuating device (28) is adjusted to change the operating mode of the motor vehicle (2) from the Neutral operating mode to one of the maneuver, the creep, the forward drive and the reverse drive operating mode.

\* \* \* \* \*